(12) United States Patent
Yoo et al.

(10) Patent No.: US 10,759,374 B2
(45) Date of Patent: Sep. 1, 2020

(54) AIR BAG FOR VEHICLE

(71) Applicants: Hyundai Motor Company, Seoul (KR); Kia Motors Corporation, Seoul (KR)

(72) Inventors: Joo Seon Yoo, Incheon (KR); Hyock In Kwon, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 117 days.

(21) Appl. No.: 15/942,869

(22) Filed: Apr. 2, 2018

(65) Prior Publication Data

US 2019/0176744 A1 Jun. 13, 2019

(30) Foreign Application Priority Data

Dec. 8, 2017 (KR) .................. 10-2017-0168391

(51) Int. Cl.
| | |
|---|---|
| *B60R 21/18* | (2006.01) |
| *B60R 21/2338* | (2011.01) |
| *B60R 21/231* | (2011.01) |
| *B60R 21/233* | (2006.01) |
| *B60R 21/00* | (2006.01) |
| *B60R 21/16* | (2006.01) |

(52) U.S. Cl.
CPC ........ *B60R 21/23138* (2013.01); *B60R 21/18* (2013.01); *B60R 21/233* (2013.01); *B60R 21/2338* (2013.01); *B60R 2021/0034* (2013.01); *B60R 2021/161* (2013.01); *B60R 2021/23146* (2013.01); *B60R 2021/23308* (2013.01); *B60R 2021/23386* (2013.01)

(58) Field of Classification Search
CPC ............ B60R 2021/161; B60R 21/207; B60R 21/23138; B60R 2021/23146; B60R 21/18; B60R 2021/23386
See application file for complete search history.

(56) References Cited

U.S. PATENT DOCUMENTS

| | | | |
|---|---|---|---|
| 5,615,909 A | * | 4/1997 | Wipasuramonton ........................ B60R 21/207 280/730.2 |
| 5,636,862 A | * | 6/1997 | Cheung ................. B60R 21/207 280/730.2 |

(Continued)

FOREIGN PATENT DOCUMENTS

| | | | | |
|---|---|---|---|---|
| DE | 19751898 A1 | * | 6/1998 | ....... B60R 21/23138 |
| DE | 10142819 A1 | * | 4/2003 | ......... B60R 21/2338 |

(Continued)

OTHER PUBLICATIONS

Machine language translation of DE-19751898A1 obtained from www.espacenet.com on Feb. 22, 2020.*

(Continued)

*Primary Examiner* — Ruth Ilan

(74) *Attorney, Agent, or Firm* — Mintz Levin Cohn Ferris Glovsky and Popeo, P.C.; Peter F. Corless

(57) ABSTRACT an airbag for a vehicle is provided. In particular, a deployment position of an airbag cushion is changed to correspond to the occupant's seating position or the occupant's lying position in response to the vehicle collision. Accordingly, the occupant is more safely protected regardless of seating position.

11 Claims, 10 Drawing Sheets

(56) References Cited

U.S. PATENT DOCUMENTS

| | | | | |
|---|---|---|---|---|
| 6,010,150 | A * | 1/2000 | Amann | B60R 21/23138 180/268 |
| 6,059,311 | A * | 5/2000 | Wipasuramonton | B60R 21/23138 280/729 |
| 7,594,678 | B2 * | 9/2009 | Schedler | B60R 21/23138 280/729 |
| 8,469,395 | B2 * | 6/2013 | Richez | B60R 21/207 280/730.2 |
| 8,469,396 | B2 * | 6/2013 | Rathmann-Ramlow | B60R 21/18 280/733 |
| 8,851,511 | B1 * | 10/2014 | Volkmann | B60R 21/23138 280/730.2 |
| 2007/0126213 | A1 * | 6/2007 | Korechika | B60R 21/02 280/730.2 |
| 2011/0241322 | A1 * | 10/2011 | Nozaki | B60R 21/23138 280/730.2 |
| 2014/0062069 | A1 * | 3/2014 | Fukawatase | B60R 21/23138 280/730.2 |
| 2015/0091283 | A1 * | 4/2015 | Yamanaka | B60R 21/18 280/733 |

FOREIGN PATENT DOCUMENTS

| | | | |
|---|---|---|---|
| JP | 10315891 A | * | 12/1998 |
| KR | 20080101478 A | | 11/2008 |

OTHER PUBLICATIONS

Machine language translation of DE-10142819A1 obtained from www.espacenet.com on Feb. 22, 2020.*

Machine language translation of JP 10-315891 obtained from www.espacenet.com on Feb. 24, 2020.*

* cited by examiner

AIR BAG FOR VEHICLE

CROSS REFERENCE TO RELATED APPLICATION

The present application claims priority to Korean Patent Application No. 10-2017-0168391, filed Dec. 8, 2017, the entire contents of which is incorporated herein for all purposes by this reference.

BACKGROUND

Field of the Invention

The present invention relates to an airbag for a vehicle, and more particularly, to an airbag of a configuration that more safely protections an occupant seated within the vehicle.

Description of the Related Art

Techniques for ensuring safety of occupants of a vehicle are being developed in addition to techniques for improving driving performance, convenience, and functionality of a vehicle. Particularly, among various safeguards being applied to a vehicle, an airbag is being applied as the most effective protection for occupants from impact.

The airbag is a device for protecting a driver and occupants during a vehicle collision, and includes a collision sensor configured to detect a collision of the vehicle; a controller configured to operate the airbag based on a detection result of the collision sensor; and an airbag module configured to operate the airbag based on a signal of the controller. The airbag may be categorized as a driver airbag, a passenger airbag, a side airbag, a roof airbag, etc., based on installation position of the airbag within the vehicle or based on the location and positioning of a person to be protected. Particularly, as autonomous vehicles become more popular, an occupant may assume a lying posture by tilting the seatback backward. However, when the occupant maintains a lying posture while the vehicle is being operated, it is impossible to safely protect the lying occupant as the occupant is outside the protection range of the airbag.

The foregoing is intended merely to aid in the understanding of the background of the present invention, and is not intended to mean that the present invention falls within the purview of the related art that is already known to those skilled in the art.

SUMMARY

Accordingly, the present invention provides an airbag for a vehicle, in which an occupant seated on a seat within a vehicle is safely protected regardless of seating position.

According to one aspect of the present invention, an airbag for a vehicle may include a protective cushion disposed at a side of a seatback, configured to be deployed in a forward direction to be disposed at a side of a head of an occupant when inflated, and formed to be gradually wider toward an occupant side such that deployment is stopped by coming into contact with a seat belt when inflated, thereby securing bearing capacity.

Further, the protective cushion may include: a first cushion portion disposed on a side of a vehicle body by protruding forward from the seatback and configured to be inflated by being supplied with gas from an inflator; and a second cushion portion disposed in front of the head of the occupant by extending from the first cushion portion toward the occupant side and configured to be inflated by being supplied with gas from the first cushion portion. Each of front portions of the first cushion portion and the second cushion portion may be formed to protrude such that a connection portion therebetween is concave. The airbag may further include a support panel connected to the front portion of the first cushion portion and to the front portion of the second cushion portion to come into contact with the seat belt when inflated.

The protective cushion may include an inner diaphragm disposed therein that crosses between the first cushion portion and the second cushion portion, and the inner diaphragm may include a vent aperture. The vent aperture may be formed at a front of the inner diaphragm. Each of the first cushion portion and the second cushion portion may extend such that a surface thereof facing the occupant side is inclined toward the occupant side. The protective cushion may further include a third cushion portion disposed in front of the head of the occupant along with the second cushion portion by extending from the second cushion portion in a lateral direction.

The protective cushion may further include a contact panel connected to both an end portion of the third cushion portion and a surface of the second cushion portion facing the occupant side and having a planar cross-section. The protective cushion may further include a fourth cushion portion disposed in front of the head of the occupant by extending downward from the second cushion portion. The protective cushion may further include a panel tether having a planar cross-section to surround an upper portion of the protective cushion and a pulling wire having a first end connected to opposite ends of the panel tether and a second end connected to a lower portion of the seatback.

Further, the second end of the pulling wire may be connected to a seatback tilting mechanism used to adjust a position of the seatback, and thus, when the seatback is tilted backward, the pulling wire may be operated in conjunction with a rotational motion of the seatback tilting mechanism, thereby receiving a pulling force. The airbag may further include an adjustment mechanism disposed at the lower portion of the seatback with the second end of the pulling wire connected thereto. The adjustment mechanism may cut the pulling wire based on a position of the seatback. In particular, the pulling wire may have a length that allows the protective cushion to be maintained tilted downward, and the adjustment mechanism may uncut the pulling wire when the seatback is tilted backward and to cut the pulling wire when the seatback is disposed forward.

According to the present invention, since the airbag for a vehicle is configured such that a deployment position of an airbag cushion may be changed to correspond to the occupant's seating position or the occupant's lying position in response to a vehicle collision, and thus, the occupant may be safely protected regardless of seating position.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinbelow, an airbag for a vehicle according to exemplary embodiments of the present invention will be described in more detail with reference to the accompanying drawings.

Figure 1:
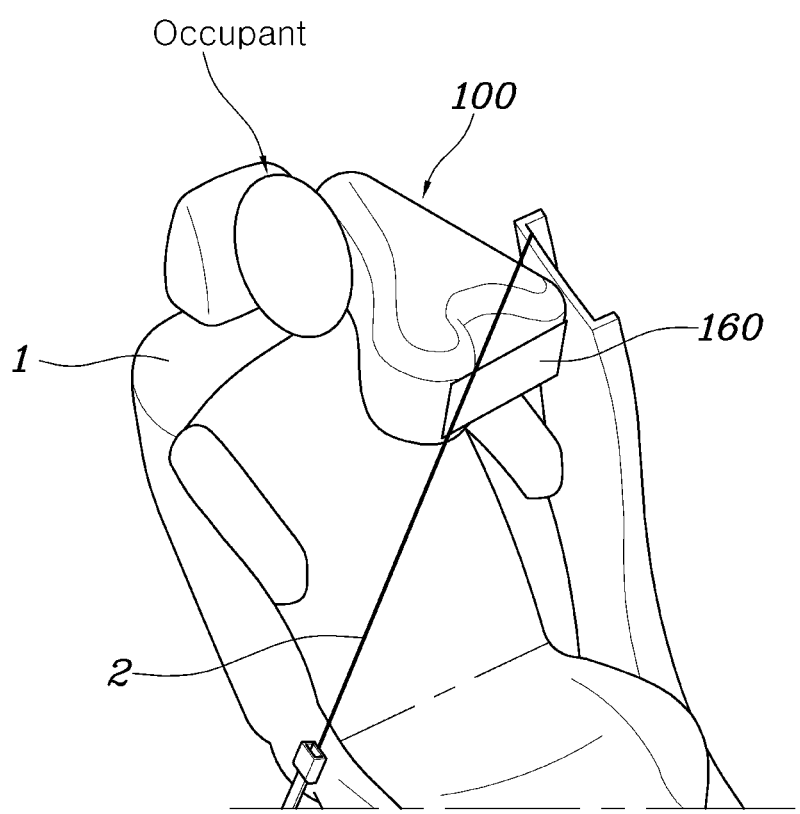
FIG. 1 is a view showing an airbag for a vehicle according to an exemplary embodiment of the present invention.
Figure 2:
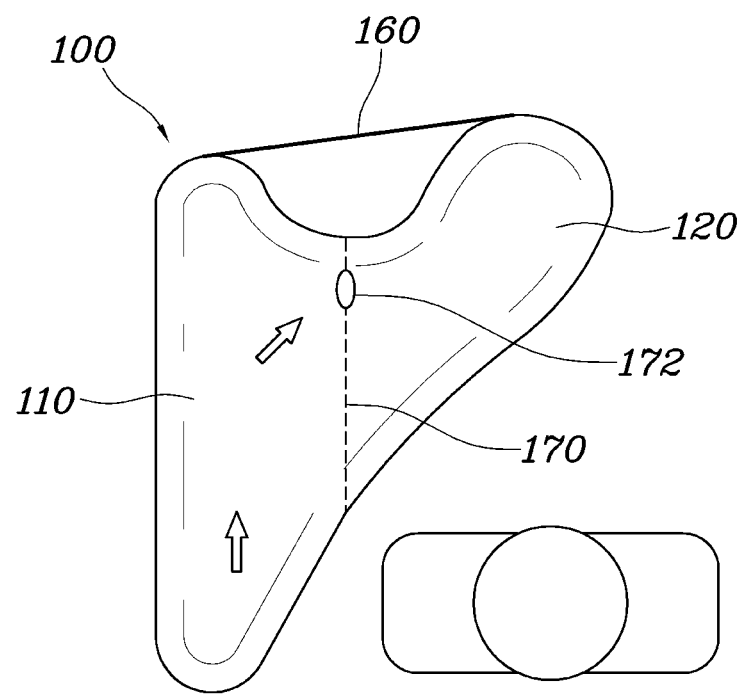
FIG. 2 is a view showing a protective cushion of the airbag for a vehicle shown in FIG. 1 according to an exemplary embodiment of the present invention.
Figure 3:
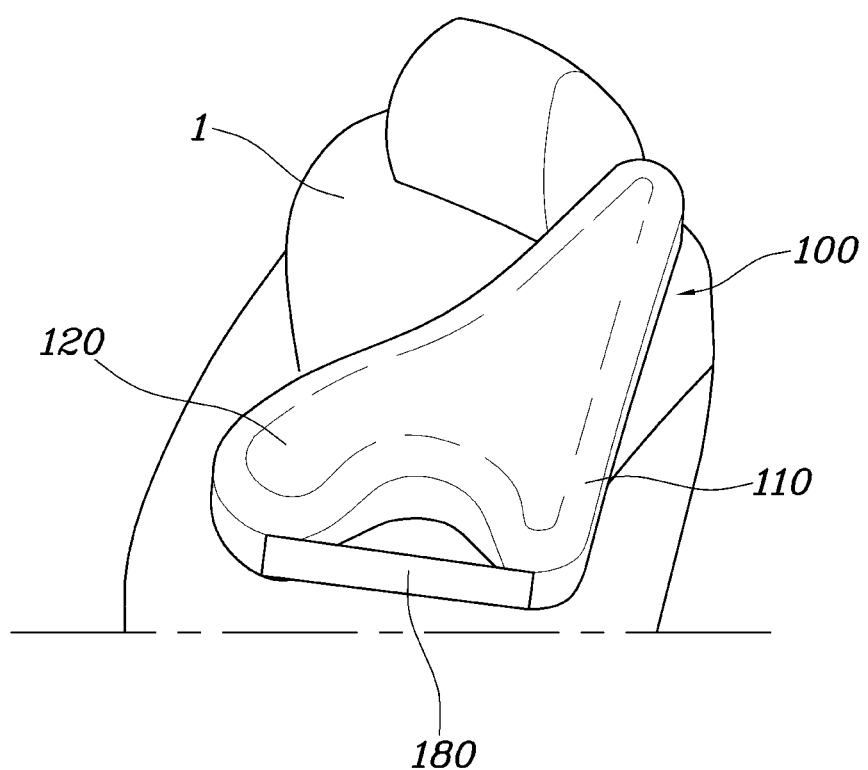
FIGS. 3 to 4 are views showing operation of the protective cushion according to the airbag for a vehicle shown in FIG. 1 according to an exemplary embodiment of the present invention.
Figure 4:
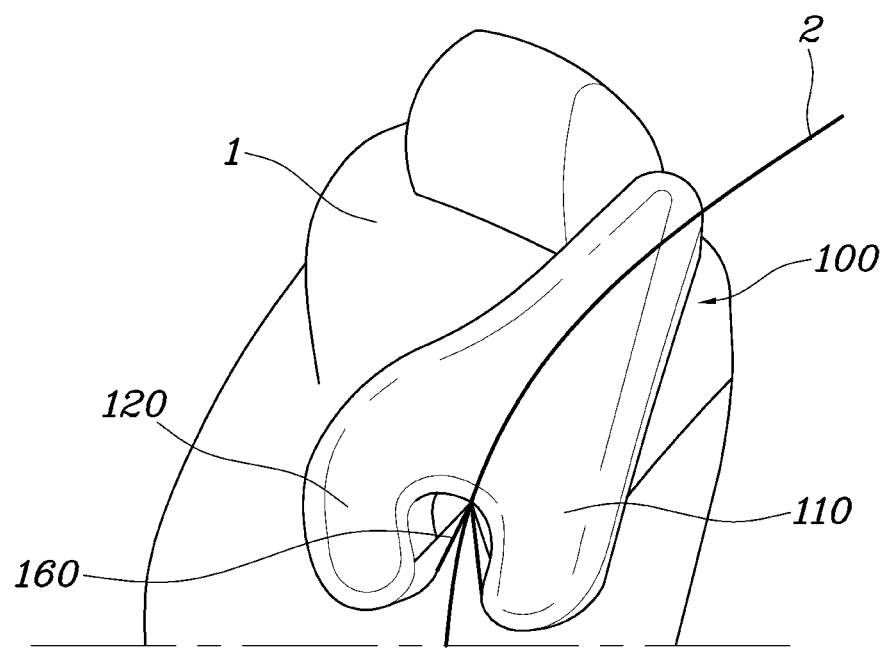
Figure 5:
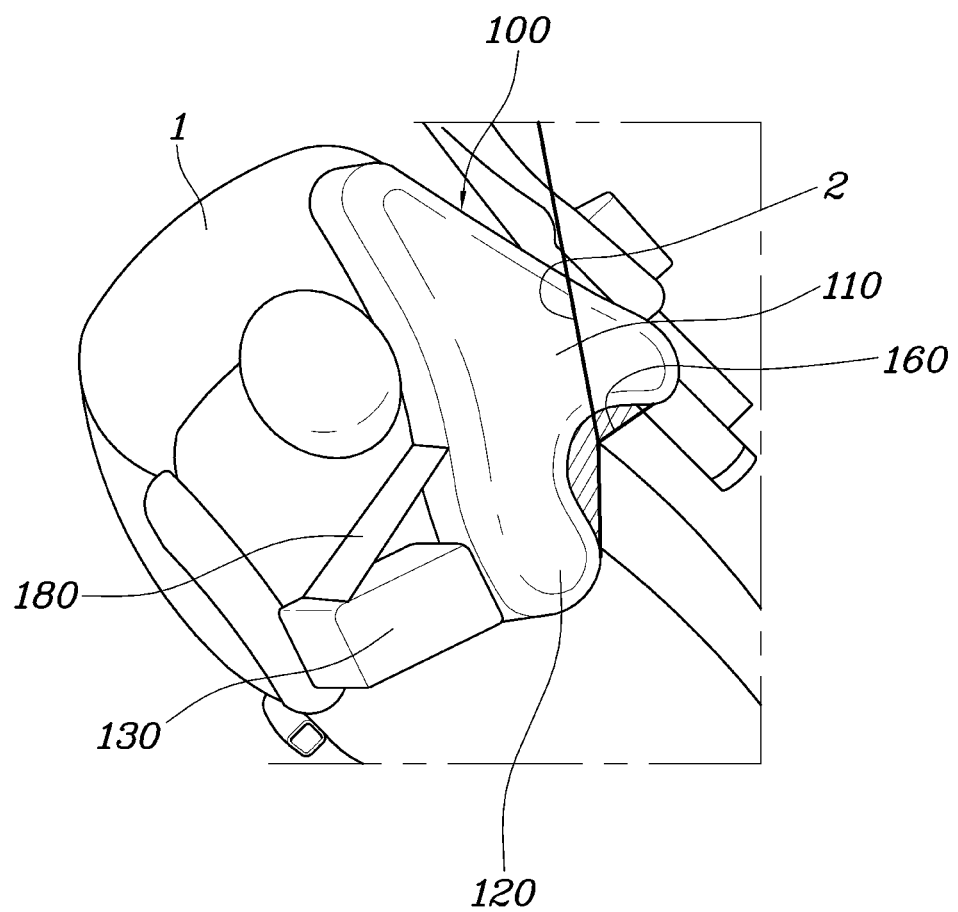
FIG. 5 is a view showing the protective cushion according to the airbag for a vehicle shown in FIG. 1 according to another exemplary embodiment of the present invention.
Figure 6:
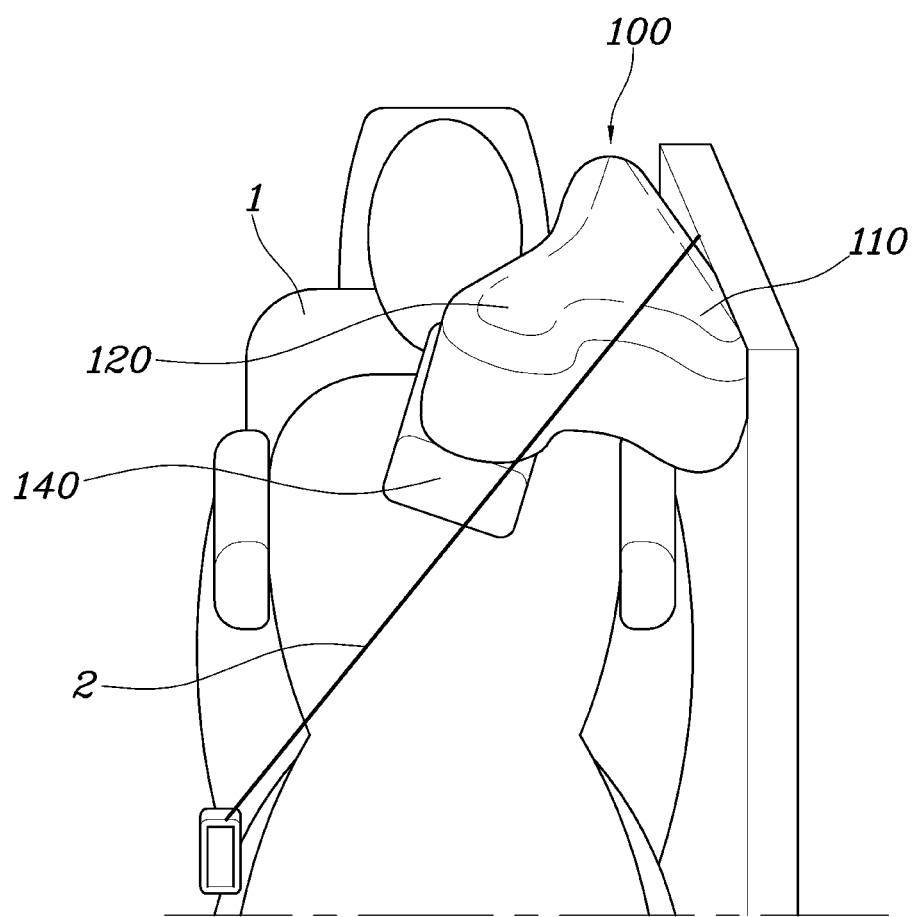
FIG. 6 is a view showing the protective cushion according to the airbag for a vehicle shown in FIG. 1 according to yet another exemplary embodiment of the present invention.
Figure 7:
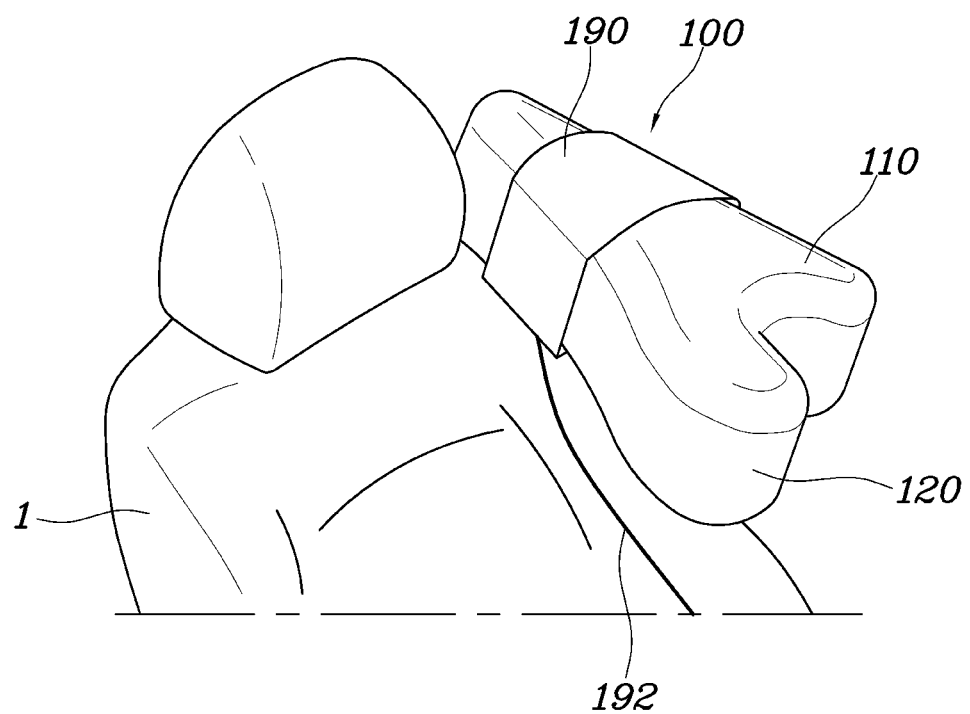
FIGS. 7 to 8 are views showing a positional change of the protective cushion according to the airbag for a vehicle shown in FIG. 1 according to an exemplary embodiment of the present invention.
Figure 8:
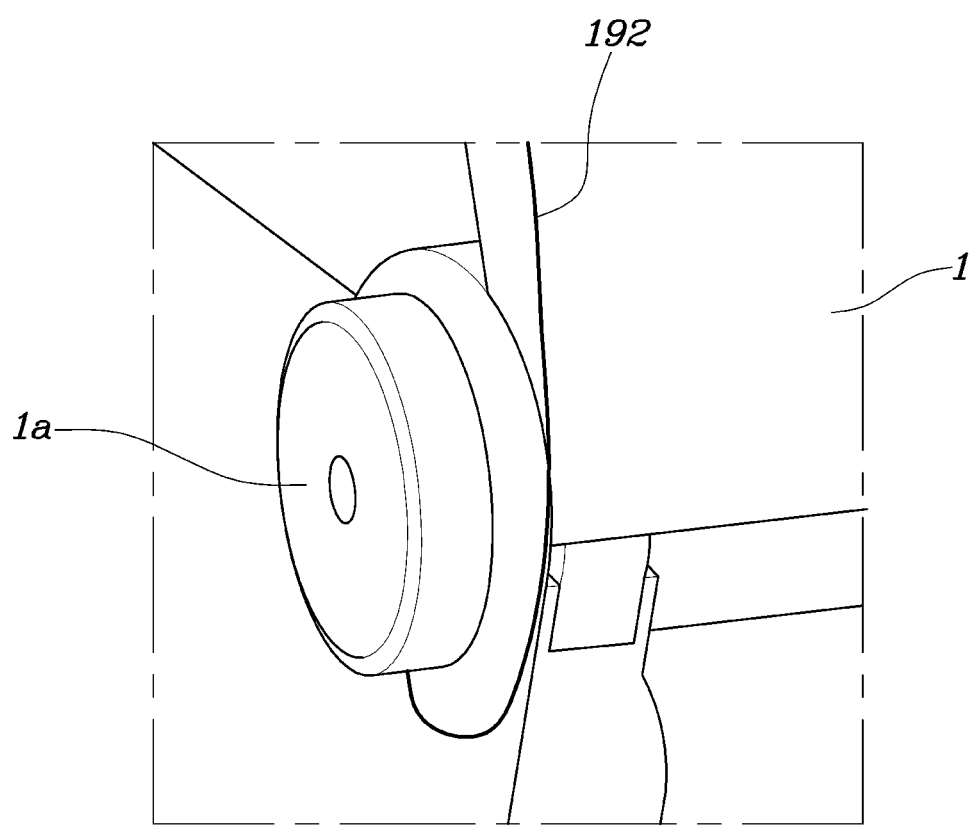
Figure 9:
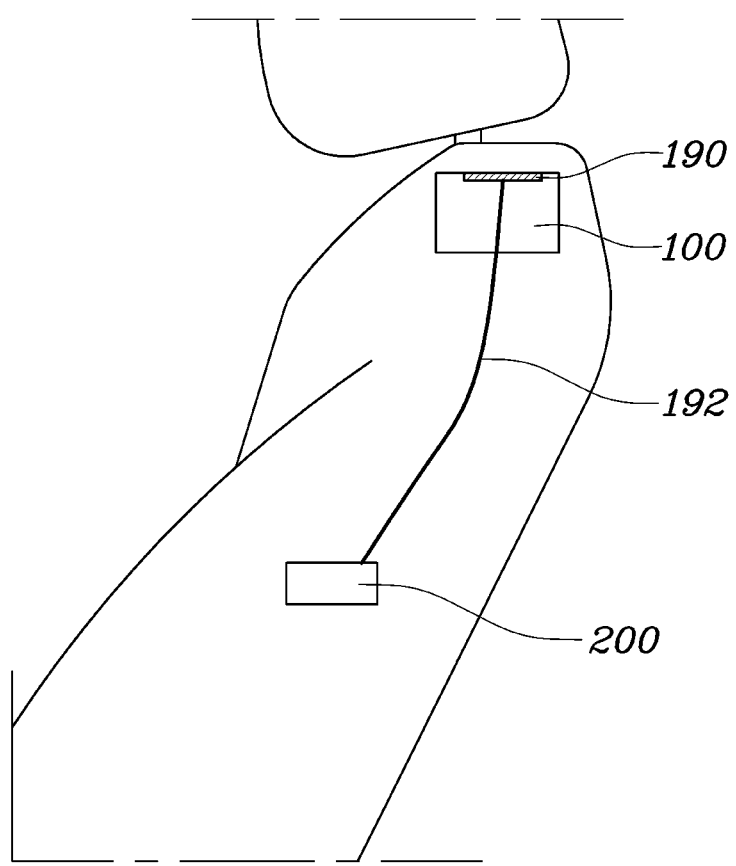
FIGS. 9 to 11 are views showing a positional change of the protective cushion according to the airbag for a vehicle shown in FIG. 1 according to another exemplary embodiment of the present invention.
Figure 10:
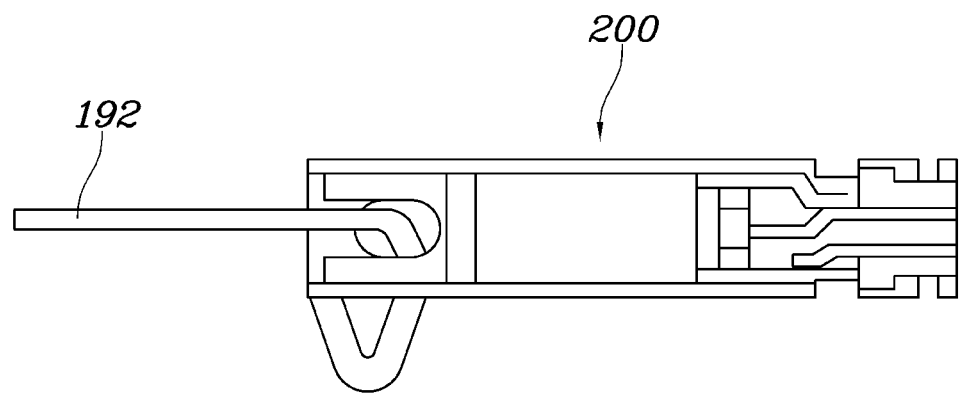
Figure 11:
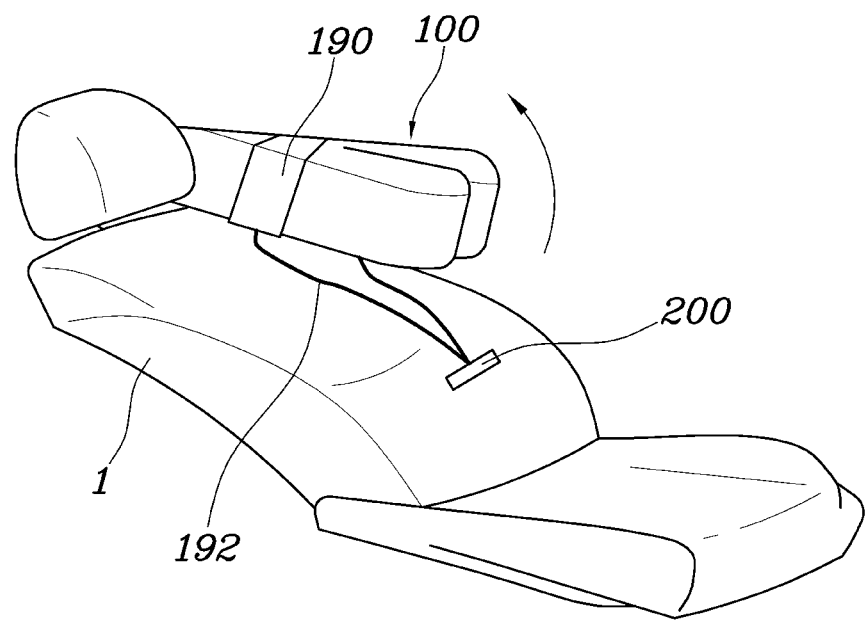

FIG. 1 is a view showing an airbag for a vehicle according to an exemplary embodiment of the present invention; FIG. 2 is a view showing a protective cushion of the airbag for a vehicle shown in FIG. 1; FIGS. 3 to 4 are views showing operation of the protective cushion according to the airbag for a vehicle shown in FIG. 1; FIG. 5 is a view showing another exemplary embodiment of the protective cushion according to the airbag for a vehicle shown in FIG. 1; FIG. 6 is a view showing a further exemplary embodiment of the protective cushion according to the airbag for a vehicle shown in FIG. 1; FIGS. 7 to 8 are views showing an exemplary embodiment of positional change of the protective cushion according to the airbag for a vehicle shown in FIG. 1; and FIGS. 9 to 11 are views showing another exemplary embodiment of positional change of the protective cushion according to the airbag fora vehicle shown in FIG. 1.

As shown in FIG. 1, an airbag for a vehicle according to the present invention may include a protective cushion 100 disposed at a side of a seatback 1, configured to be deployed in a forward direction to then be disposed at a side of a head of an occupant when inflated, and formed to be gradually wider toward an occupant side such that deployment is stopped by coming into contact with a seat belt 2 when inflated, thereby securing bearing capacity.

Herein, the protective cushion 100 may be disposed at an upper portion of the seatback 1, and may be deployed forward from over a shoulder of the occupant and disposed between the occupant and a vehicle body. Particularly, since the protective cushion 100 is gradually wider in a width direction thereof, the protective cushion may come into contact with a seat belt 2 when inflated. In other words, the protective cushion 100 may have width gradually wider toward an occupant side, whereby the deployment of the protective cushion is prevented by coming into contact with the seat belt 2 worn by the occupant during inflation, and as the head of the occupant is supported by the bearing capacity generated by the seat belt 2, the head of the occupant may be prevented from being bent or otherwise positioned incorrectly and may be protected from side impact.

In particular, when an occupant maintains a lying posture or other similar positioning within the vehicle by tilting the seatback 1 backward (e.g., toward the rear of the vehicle), unless the protective cushion 100 is provided, the seat belt 2 may wrap around the occupant's neck causing additional injury. In the present invention, the protective cushion 100 protects the occupant in conjunction with the seat belt 2, and thus, it may be possible to more safely protect the occupant based on a posture maintained by the occupant. As shown in FIG. 2, the protective cushion 100 may include: a first cushion portion 110 disposed on a vehicle body side by protruding forward from the seatback 1 and may configured to be inflated by being supplied with gas from an inflator; and a second cushion portion 120 disposed in front of the head of the occupant by extending from the first cushion portion 110 toward the occupant side and configured to be inflated by being supplied with gas from the first cushion portion 110.

Accordingly, the protective cushion 100 may include the first cushion portion 110 and the second cushion portion 120, wherein the first cushion portion 110 may be inflated by being supplied with gas directly from the inflator and disposed between the vehicle body and the head of the occupant. In the first cushion portion 110, the second cushion portion 120 that extends toward the occupant side may be inflated by being supplied with gas from the first cushion portion 110 and disposed in front of the head of the occupant, thereby supporting the head of the occupant and preventing the head of the occupant from moving forward (e.g., prevents involuntary forward thrusting of head).

Herein, since the first cushion portion 110 may be inflated by being supplied with gas directly from the inflator, the deployment rate may be secured, and since the second cushion portion 120 may be inflated by being supplied with gas from the first cushion portion 110, the deployment rate may be delayed. Thus, the first cushion portion 110 may be deployed forward and the second cushion portion 120 may be deployed toward the head of the occupant to avoid contact with the occupant.

Meanwhile, as shown in FIG. 2, the protective cushion 100 may include an inner diaphragm 170 disposed therein that crosses between the first cushion portion 110 and the second cushion portion 120. The inner diaphragm 170 may further include a vent aperture 172. Herein, the vent aperture 172 may be disposed at a front of the inner diaphragm 170.

In particular, the inner diaphragm 170 may extend within the protective cushion 100 in forward and backward directions to be divided into the first cushion portion 110 and the second cushion portion 120. The vent aperture 172 may be formed at the front of the inner diaphragm 170. The first cushion portion 110 may first be inflated by being supplied with gas from the inflator, then the gas in the first cushion portion 110 may pass through the vent aperture 172 and move to the second cushion portion 120, and the second cushion portion 120 may then be inflated. As described above, as the inflation of the first cushion portion 110 and the second cushion portion 120 may be adjusted by the inner diaphragm 170, the deployment rate of the first cushion portion 110 may be secured, and thus, it may possible to prevent the second cushion portion 120 from contacting (e.g., hitting) the occupant when deployed. That is, contact between the second cushion portion 120 and the occupant is prevented or blocked accordingly.

Meanwhile, each of the first cushion portion 110 and the second cushion portion 120 may extend such that a surface thereof facing the occupant side is inclined toward the occupant side. As shown in FIG. 2, since each of the first cushion portion 110 and the second cushion portion 120 may have a surface thereof facing the occupant side that extends to be inclined, when the protective cushion 100 is inflated, the first cushion portion 110 and the second cushion portion 120 may be deployed more smoothly forward without being interfered with by the head of the occupant. Further, when the inflation of the protective cushion 100 is complete, the head of the occupant may be safely placed.

Meanwhile, as shown in FIG. 3, each of front portions of the first cushion portion 110 and the second cushion portion 120 may be formed to protrude such that a connection portion therebetween is concave. The airbag may further include a support panel 160 connected to the front portion of the first cushion portion 110 and to the front portion of the second cushion portion 120, to come into contact with the seat belt 2 when inflated. Accordingly, since a portion between the front portions of the first cushion portion 110 and the second cushion portion 120 is formed in a concave shape, the seat belt 2 may be guided and seated into the concave portion when the protective cushion 100 is inflated. Further, when the seat belt 2 is seated in the concave portion of the protective cushion 100 when the protective cushion 100 is inflated, the seat belt 2 may remain in contact with the protective cushion 100 without being separated therefrom by being surrounded by the front portions of the first cushion portion 110 and the second cushion portion 120.

In addition, as shown in FIGS. 3 to 4, since the support panel 160 that connects the front portion of the first cushion portion 110 and to the front portion of the second cushion portion 120 together may be disposed in the protective cushion 100, the support panel 160 may come into contact with the seat belt 2 when the protective cushion 100 is inflated, and the support panel 160 may be deformed by the seat belt 2, whereby a distance between the front portion of the first cushion portion 110 and to the front portion of the second cushion portion 120 may be reduced.

In other words, when the protective cushion 100 is inflated, as shown in FIG. 3, the support panel 160 connected to the front portion of the first cushion portion 110 and to the front portion of the second cushion portion 120 may be spread (e.g., spread apart, separated, etc.). Particularly, when the support panel 160 is deformed by the seat belt 2, as shown in FIG. 4, the distance between the front portion of the first cushion portion 110 and to the front portion of the second cushion portion 120 may be reduced, whereby the front portion of the first cushion portion 110 and to the front portion of the second cushion portion 120 surround the seat belt 2. Accordingly, the seat belt 2 may be surrounded by the first cushion portion 110 and the second cushion portion 120, thereby being prevented from being separated from the protective cushion 100. Further, the first cushion portion 110 and the second cushion portion 120 may be centered on the seat belt 2 by the support panel 160 to secure the bearing capacity for the front, thereby more reliably supporting and protecting the head of the occupant. Meanwhile, the protective cushion 100 may be formed in various shapes in addition to the first exemplary embodiment in which the first cushion portion 110 and the second cushion portion 120 are provided.

As a second exemplary embodiment of the protective cushion 100, as shown in FIG. 5, wherein the protective cushion 100 may further include a third cushion portion 130 disposed in front of the head of the occupant along with the second cushion portion 120 by extending from the second cushion portion 120 in a lateral direction. In particular, the protective cushion 100 may further include the third cushion portion 130 that extends from the second cushion portion 120 in a lateral direction, other than the first cushion portion 110 and the second cushion portion 120. Accordingly, in the event of a vehicle collision, the second cushion portion 120 and the third cushion portion 130 surround the head of the occupant being moved forward, and thus, the head of the occupant may be prevented from being moved excessively.

In addition, the protective cushion 100 may further include a contact panel 180 connected to both an end portion of the third cushion portion 130 and a surface of the second cushion portion 120 facing the occupant side and having a planar cross-section. Since the contact panel 180 may be connected to both the end portion of the third cushion portion 130 and the surface of the second cushion portion 120, the contact panel may be disposed in front of the head of the occupant when the protective cushion 100 is inflated, and when the head of the occupant comes into contact with the contact panel 180, the contact panel 180 may be deformed to surround the head of the occupant, whereby the end portion of the third cushion portion 130 may be pulled toward the second cushion portion 120. Accordingly, in the event of a vehicle collision, the head of the occupant may be surrounded by the second cushion portion 120 and the third cushion portion 130, and thus, inaccurate or abrupt bending of the head of the occupant may be prevented against frontal impact of the vehicle as well as oblique impact.

Meanwhile, as a third exemplary embodiment of the protective cushion 100, as shown in FIG. 6, the protective cushion 100 may further include a fourth cushion portion 140 disposed in front of the head of the occupant by extending downward from the second cushion portion 120. In particular, as the fourth cushion portion 140 extends downward of the second cushion portion 120, it is possible to more stably support the head of the occupant being moved forward by a vehicle collision. Further, the head of the occupant is positioned low in height when the occupant maintains a lying position, and thus, the fourth cushion portion 140 may be disposed at a location below the second cushion portion 120.

Accordingly, it is possible to more stably support the head of the occupant in both the occupant's lying position and the occupant's seating position.

The above-described exemplary embodiments of the protective cushion 100 may be selectively applied according to the capacity of the protective cushion 100, and the protection performance for the occupant may be further secured by combining the various exemplary embodiments.

Meanwhile, as shown in FIG. 7, the protective cushion 100 may further include: a panel tether 190 having a planar cross-section to surround an upper portion of the protective cushion 100; and a pulling wire 192 with a first end thereof connected to opposite ends of the panel tether 190 and a second end thereof connected to a lower portion of the seatback 1. In particular, since the protective cushion 100 may be connected to the panel tether 190 with the upper portion of the protective cushion surrounded by the panel tether, and the panel tether 190 may be pulled downward by the pulling wire 192 fastened to the seatback 1, the protective cushion 100 may be placed in front of the head of the occupant when the protective cushion 100 is inflated. Herein, the panel tether 190 may have a planar cross-section, whereby a contact area with the protective cushion 100 may increase to supply a sufficient pulling force, and the pulling wire 192 may be connected to the opposite ends of the panel tether 190, whereby the pulling force transmitted to the panel tether 190 may be provided in a more balanced manner.

In particular, the second end of the pulling wire 192 may be connected to a seatback tilting mechanism 1a used to adjust a position of the seatback 1, and thus, when the seatback 1 is tilted backward, the pulling wire may be operated in conjunction with a rotational motion of the seatback tilting mechanism 1a, thereby receiving a pulling force. In other words, as shown in FIG. 8, the seatback 1 may include the seatback tilting mechanism 1a used to adjust a position of the seatback 1. The seatback tilting mechanism 1a may include a recliner, a rotating bracket, and the like. The configuration of the seatback tilting mechanism 1a for adjusting the position of the seatback 1 is a conventional technology and a detailed description thereof is omitted. However, the pulling wire 192 of the present invention should be connected to a configuration, which is rotated when the position of the seatback 1 is changed in the forward and backward directions, of the configurations of the seatback tilting mechanism 1a, and should be prevented from being interfered with by any other configurations of the seatback tilting mechanism 1a.

Accordingly, as the second end of the pulling wire 192 is connected to the seatback tilting mechanism 1a, the seatback tilting mechanism 1a may be rotated when the seatback 1 is tilted backward, and the pulling force may be provided to the pulling wire 192, whereby the pulling wire 192 pulls the panel tether 190 downward. As described above, as the seatback 1 is tilted backward, the position of the protective cushion 100 may be adjusted to a lower position by the panel tether 190 and the pulling wire 192 when the occupant maintains a lying posture, to dispose the protective cushion 100 in front of the head of the occupant in the occupant's lying position, and thus, it is possible to more securely protect the head of the occupant.

Meanwhile, as shown in FIGS. 9 to 11, the airbag may further include an adjustment mechanism 200 disposed at the lower portion of the seatback 1, with the second end of the pulling wire 192 connected thereto. The adjustment mechanism may be configured to cut the pulling wire 192 based on a position of the seatback 1. As described above, since the adjustment mechanism 200 may be disposed in the seatback 1 and the pulling wire 192 may be connected to the adjustment mechanism 200, the position of the protective cushion 100 connected via the pulling wire 192 and the panel tether 190 may be determined based on whether the adjustment mechanism 200 is operated. Herein, the adjustment mechanism 200 may be a cutting device shown in FIG. 10, and the pulling wire 192 may be cut when a cutting edge advances by a solenoid operation. In particular, the pulling wire 192 may have a length that allows the protective cushion 100 to be maintained tilted downward, and the adjustment mechanism 200 may be configured to uncut the pulling wire 192 when the seatback 1 is tilted backward and to cut the pulling wire 192 when the seatback 1 is disposed forward. In other words, the adjustment mechanism 200 may not be allowed to cut the pulling wire 192 when the seatback 1 is tilted backward, and the adjustment mechanism 200 may be allowed to cut the pulling wire 192 when the seatback 1 is disposed forward.

As shown in FIG. 11, when the protective cushion 100 is pulled downward by the panel tether 190 and the pulling wire 192 may be an initial state. This state corresponds to the occupant's lying position as the seatback 1 is tilted backward, and thus, the protective cushion 100 may be disposed in front of the head of the occupant in the occupant's lying position as the state where the protective cushion 100 pulled downward by the panel tether 190 and the pulling wire 192 is maintained.

Meanwhile, when the seatback 1 is disposed forward (e.g., in a non-tilted position), the adjustment mechanism 200 may be operated to cut the pulling wire 192. This state corresponds to the occupant's seating position, wherein the pulling wire 192 providing the pulling force to the protective cushion 100 may be cut by the adjustment mechanism 200, whereby the protective cushion 100 may be moved upward. Accordingly, the protective cushion 100 may be disposed in front of the head of the occupant in the occupant's seating position. The position of the above-described seatback 1 depends on the angle of the seatback 1, and the occupant's lying position or the occupant's seating position may be determined based on the angle of the seatback 1. Accordingly, it is self-evident that a sensor is provided in the seatback 1, and a control module or controller may be configured to operate the adjustment mechanism 200 by receiving information based on the angle of the seatback 1.

According to the present invention, since the airbag for a vehicle is configured such that a deployment position of an airbag cushion is changed to correspond to the occupant's seating position or the occupant's lying position in response to the vehicle collision, the occupant may be more safely protected regardless of seating positions.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. An airbag for a vehicle, comprising:
a protective cushion disposed at a side of a seatback,
wherein the protective cushion is deployed in a forward direction to be disposed at a side of a head of an occupant when inflated, and is formed gradually wider toward an occupant side such that deployment is stopped by coming into contact with a seat belt when inflated to secure bearing capacity, and wherein the protective cushion includes:

a first cushion portion disposed on a vehicle body side by protruding forward from the seatback and configured to be inflated by being supplied with gas from an inflator;

a second cushion portion adapted to be disposed in front of the head of the occupant by extending from the first cushion portion toward the occupant side and configured to be inflated by being supplied with gas from the first cushion portion; and a third cushion portion adapted to be disposed in front of the head of the occupant along with the second cushion portion by extending from the second cushion portion in a lateral direction.

2. The airbag of claim 1, wherein each of front portions of the first cushion portion and the second cushion portion is formed to protrude with a connection portion therebetween that is concave, and wherein the airbag includes a support panel connected to the front portion of the first cushion portion and to the front portion of the second cushion portion to come into contact with the seat belt when inflated.

3. The airbag of claim 1, wherein an inner diaphragm is disposed within the protective cushion and the inner diaphragm crosses between the first cushion portion and the second cushion portion and includes a vent aperture.

4. The airbag of claim 3, wherein the vent aperture is disposed at a front of the inner diaphragm.

5. The airbag of claim 1, wherein each of the first cushion portion and the second cushion portion extends such that a surface thereof facing the occupant side is inclined toward the occupant side.

6. The airbag of claim 1, wherein the protective cushion further includes a contact panel connected to both an end portion of the third cushion portion and a surface of the second cushion portion facing the occupant side and configured to have a planar cross-section.

7. The airbag of claim 1, wherein the protective cushion further includes a fourth cushion portion adapted to be disposed in front of the head of the occupant by extending downward from the second cushion portion.

8. An airbag for a vehicle, comprising:

a protective cushion disposed at a side of a seatback, wherein the protective cushion is deployed in a forward direction to be disposed at a side of a head of an occupant when inflated, and is formed gradually wider toward an occupant side such that deployment is stopped by coming into contact with a seat belt when inflated to secure bearing capacity, wherein the protective cushion further includes:

a panel tether having a planar cross-section to surround an upper portion of the protective cushion; and a pulling wire with a first end thereof connected to opposite ends of the panel tether and a second end thereof connected to a lower portion of the seatback.

9. The airbag of claim 8, wherein the second end of the pulling wire is connected to a seatback tilting mechanism configured to adjust a position of the seatback and when the seatback is tilted backward, the pulling wire is operated in conjunction with a rotational motion of the seatback tilting mechanism, thereby receiving a pulling force.

10. The airbag of claim 8, further comprising:

an adjustment mechanism disposed at the lower portion of the seatback with the second end of the pulling wire connected thereto, wherein the adjustment mechanism is configured to cut the pulling wire based on a position of the seatback.

11. The airbag of claim 10, wherein the pulling wire is configured to have a length that allows the protective cushion to be maintained tilted downward, and the adjustment mechanism is configured to not cut the pulling wire when the seatback is tilted backward and to cut the pulling wire when the seatback is disposed forward.

\* \* \* \* \*